Dec. 8, 1936.  R. GÜRTLER  2,063,307
WAVE GENERATION SYSTEM
Filed Nov. 10, 1933
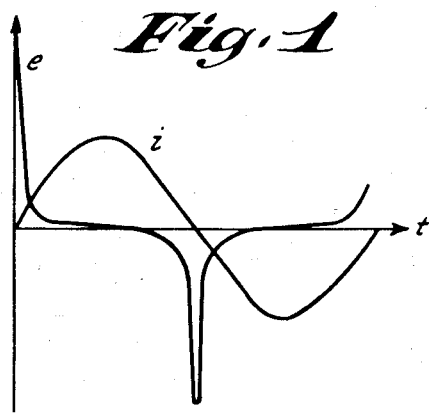
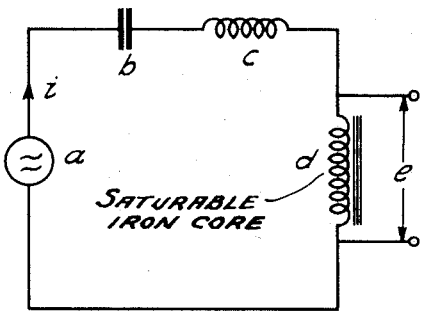
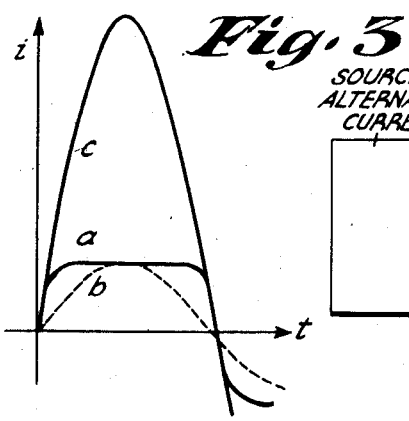
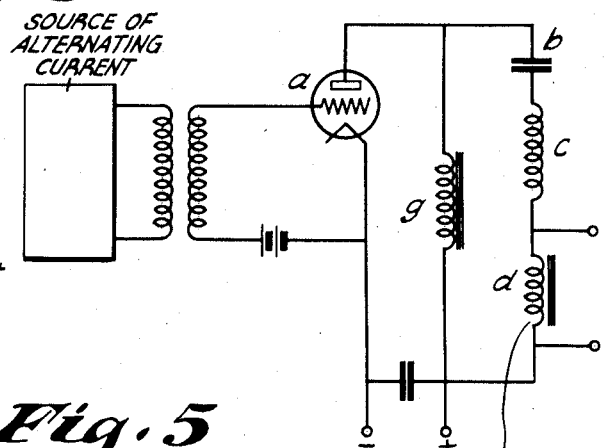
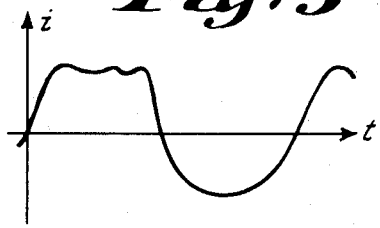
INVENTOR
RUDOLF GURTLER
BY
ATTORNEY Patented Dec. 8, 1936

2,063,307

UNITED STATES PATENT OFFICE 2,063,307

WAVE GENERATION SYSTEM

Rudolf Gürtler, Berlin, Germany, assignor to Telefunken Gesellschaft für Drahtlose Telegraphie m. b. H., Berlin, Germany, a corporation of Germany Application November 10, 1933, Serial No. 697,408
In Germany November 19, 1932

3 Claims. (Cl. 250—36)

This invention relates to a circuit arrangement for the production of voltage peaks by means of saturated iron inductances.

The nature of the present invention and the manner in which the same may be carried out will be understood from the following detailed description when read in connection with the attached drawing, in which Fig. 1 shows the well known distorted voltage shape obtained by supplying a sinusoidal current to a saturated inductance;

Fig. 2 illustrates a known circuit for obtaining the distorted voltage curve shown in Fig. 1;

Fig. 4 illustrates one manner of carrying out the principles of the present invention; and Figs. 3 and 5 are curves illustrating the operation of the circuit of Fig. 4.

If the winding of a choke coil or transformer having an iron core is fed by a sinusoidal alternating current of such value that during a greater part of the half cycle the core is highly saturated, a highly distorted voltage with relatively high voltage peaks will be obtained.

Figure 1 shows schematically the course of current and voltage of a saturated iron choke in relation to time. Such saturated iron chokes or iron transformers are used, for an example, for the purposes of frequency multiplication and often also where periodical voltage peaks of short duration are required as, for instance, for the line or picture control in television receivers with Braun tubes.

Figure 2 shows the simplest arrangement which has long been known. The generator $a$ furnishes sinusoidal alternating voltage, $b$ is a capacity, $c$ is an inductance independent of the current, $d$ represents the saturated iron choke. The capacity $b$ and inductance $c$ are used for the purpose of tuning the circuit approximately to the frequency of the fundamental, so that the current source supplies practically sinusoidal current which produces at $d$ the distorted voltage shown by "$e$" in Fig. 1.

In accordance with the invention, a much greater effect of the saturated choke is obtained if it is fed by an alternating current which increases and decreases at greater steepness than a sinusoidal alternating current of approximately the same peak value. In Figure 2, $a$ represents schematically one of the possible curve shapes which may be chosen for the feeding of the choke in the sense of the invention, whereas $b$ represents a sinusoidal current of the same peak value as $a$, and $c$ showing a sinusoidal course of the current which would cause an equally high voltage peak as in case of $a$. In case of the sinus current $c$, a current source is needed supplying a larger current. The losses in generator $a$ of Figure 2, in choke $d$, etc., would be much greater thus, particularly for very low generator frequency, technical difficulties would be encountered in the construction of the saturated choke.

Figure 4 shows one embodiment of the invention by way of example, wherein the portion to the right of choke coil $g$ is indentical with Fig. 2, and the left portion including $g$ takes the place of generator "$a$" of Fig. 2 for producing applicant's results. At a suitable grid bias, an alternating voltage is applied to the grid of tube $a$ of such value that the tube will be controlled at a greatly excessive value. An alternating current then flows through circuit $b$—$c$—$d$ which, at least in the upper half wave, is similar to the curve $a$ in Figure 3 and which has principally the curve shape of Figure 5.

In Figure 4, $b$ is a capacity, $c$ is an inductance independent of the current which may eventually also be omitted, $d$ is a choke with iron core saturated during a large part of the half cycle. The plate potential is supplied across choke $g$.

Having thus described my invention and the operation thereof, what I claim is:

1. A device for producing oscillatory energy comprising, an electron discharge tube having input and output electrodes, and a tuned output circuit connected with the output electrodes of said tube comprising a capacity and an inductive reactance of the iron core type, means for saturating the iron core of said inductive reactance during normal operating conditions of said device including a source of potential connected to said input electrodes whose peak value is greater than the value of energy necessary to saturate the iron core of said reactance, said tube being arranged to supply said tuned output circuit with an alternating current of greater slope than a symmetrical sinusoidal wave of approximately the same peak value, whereby a flat top alternating wave shape is applied to said tuned output circuit, the iron core inductance of said output circuit having such value that it is magnetically saturated during the largest part of the time of every alternate half cycle of the flat top wave.

2. A device for producing oscillatory energy comprising a tube having grid, anode, and cathode electrodes, a connection including an iron core choke coil extending from the positive terminal of a source of potential to said anode, a series tuned output circuit including a condenser, an inductance and an iron core choke coil across said first coil, and utilization terminals across said last iron core choke coil, means for saturating the iron core in said last choke coil during normal operating conditions of said device including a circuit for suitably biasing said grid and a source of alternating potential connected to said grid whose peak value is greater than the value of energy necessary to saturate the iron of said choke coil, said tube being arranged to supply said series tuned circuit with an alternating current of greater slope than a symmetrical sinusoidal wave of approximately the same peak value, whereby a flat top alternating wave shape is applied to said series tuned circuit, the iron core inductance of said tuned circuit having such value that it is magnetically saturated during the largest part of the time of every alternate half cycle of the flat top wave.

3. A system for producing oscillatory energy comprising a series tuned output circuit including a condenser in series with an iron core inductance, and means for supplying alternating potentials to said series combination of condenser and inductance which increase and decrease with greater steepness than a sinusoidal alternating current of approximately the same peak value, said alternating potentials having a peak value greater than the value of energy necessary to saturate the iron core of said inductance, said iron core inductance having such value that it is magnetically saturated during the largest part of the time of every alternate half cycle of the supplied wave.

RUDOLF GÜRTLER.